US009476287B2

(12) United States Patent
Jiang et al.

(10) Patent No.: US 9,476,287 B2
(45) Date of Patent: *Oct. 25, 2016

(54) AQUEOUS SOLUTION AND METHOD FOR USE THEREOF

(71) Applicant: Schlumberger Technology Corporation, Sugar Land, TX (US)

(72) Inventors: Li Jiang, Katy, TX (US); Bruno Lecerf, Houston, TX (US); Timothy G.J. Jones, Cambridge (GB); Murtaza Ziauddin, Katy, TX (US); Richard Hutchins, Sugar Land, TX (US); Jian He, Sugar Land, TX (US); Jack Li, Sugar Land, TX (US); Chad Kraemer, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 286 days.

This patent is subject to a terminal disclaimer.

(21) Appl. No.: 14/072,395

(22) Filed: Nov. 5, 2013

(65) Prior Publication Data
US 2015/0122485 A1    May 7, 2015

(51) Int. Cl.
E21B 41/02    (2006.01)
C09K 8/54    (2006.01)
E21B 43/28    (2006.01)

(52) U.S. Cl.
CPC ............ *E21B 41/02* (2013.01); *C09K 8/54* (2013.01); *E21B 43/28* (2013.01); *C09K 2208/32* (2013.01)

(58) Field of Classification Search
None
See application file for complete search history.

(56) References Cited

U.S. PATENT DOCUMENTS

| 2,485,529 | A | * | 10/1949 | Cardwell | ............... | C23G 1/04 |
| | | | | | | 510/263 |
| 2,860,106 | A | | 11/1958 | Little et al. | | |
| 3,826,312 | A | | 7/1974 | Richardson et al. | | |
| 3,892,275 | A | | 7/1975 | Lybarger et al. | | |
| 3,920,566 | A | | 11/1975 | Richardson et al. | | |
| 3,920,591 | A | | 11/1975 | Jacobs et al. | | |
| 3,936,316 | A | | 2/1976 | Gulla | | |
| 3,953,340 | A | | 4/1976 | Templeton et al. | | |
| 3,953,352 | A | | 4/1976 | Mizutani et al. | | |
| 3,963,650 | A | | 6/1976 | Ogden | | |

(Continued)

FOREIGN PATENT DOCUMENTS

| EP | 0123066 | 10/1988 |
| EP | 1136529 | 9/2001 |

(Continued)

OTHER PUBLICATIONS

International Search Report and Written Opinion issued in PCT/US2014/061015 Jan. 19, 2015, 10 pages.

(Continued)

*Primary Examiner* — Angela M DiTrani
*Assistant Examiner* — Anuradha Ahuja
(74) *Attorney, Agent, or Firm* — Jeffrey R. Anderson; Michael L. Flynn; Tim Curington

(57) ABSTRACT

Oilfield treatment compositions contain water, hydrochloric acid at a concentration between 15 wt % and 45.7 wt % and a first and second fixing agent. The first fixing agent comprises urea, a urea derivative or both. The second fixing agent may be a mixture or amines and alcohols. These compositions provide corrosion inhibition when exposed to steel. The compositions may also contain an inhibitor aid.

6 Claims, 1 Drawing Sheet

(56) References Cited

U.S. PATENT DOCUMENTS

| | | | |
|---|---|---|---|
| 4,116,664 A | 9/1978 | Jones | |
| 4,151,098 A | 4/1979 | Dill et al. | |
| 4,315,763 A | 2/1982 | Stoller et al. | |
| 4,370,256 A | 1/1983 | Oakes | |
| 4,420,414 A * | 12/1983 | Valone | C10M 133/04 |
| | | | 106/14.15 |
| 4,428,432 A | 1/1984 | Pabley | |
| 4,466,893 A * | 8/1984 | Dill | C09K 8/74 |
| | | | 166/307 |
| 4,487,265 A | 12/1984 | Watanabe | |
| 4,557,838 A | 12/1985 | Nichols et al. | |
| 4,567,946 A | 2/1986 | Watanabe | |
| 4,631,138 A | 12/1986 | Johns et al. | |
| 4,648,456 A | 3/1987 | Lamb et al. | |
| 4,673,522 A | 6/1987 | Young | |
| 4,675,120 A | 6/1987 | Martucci | |
| 4,753,746 A | 6/1988 | Mesmer et al. | |
| 4,807,703 A | 2/1989 | Jennings, Jr. | |
| 4,830,766 A | 5/1989 | Gallup et al. | |
| 5,120,471 A * | 6/1992 | Jasinski | C09K 8/54 |
| | | | 252/389.54 |
| 5,366,643 A | 11/1994 | Walker | |
| 5,616,151 A | 4/1997 | Sargent et al. | |
| 5,650,633 A | 7/1997 | Ahmed et al. | |
| 5,672,279 A | 9/1997 | Sargent et al. | |
| 5,708,107 A | 1/1998 | Ahmed et al. | |
| 5,763,610 A | 6/1998 | Ahmed et al. | |
| 5,854,180 A | 12/1998 | Scherubel et al. | |
| 5,855,244 A | 1/1999 | Ahmed et al. | |
| 5,883,210 A | 3/1999 | Ahmed et al. | |
| 5,919,375 A | 7/1999 | Sargent et al. | |
| 5,922,653 A | 7/1999 | Ahmed et al. | |
| 5,990,051 A * | 11/1999 | Ischy | E21B 43/261 |
| | | | 166/294 |
| 6,051,670 A | 4/2000 | Ahmed et al. | |
| 6,117,364 A * | 9/2000 | Vorderbruggen | C09K 8/54 |
| | | | 252/395 |
| 6,340,660 B1 | 1/2002 | Gastgaber | |
| 6,365,121 B1 | 4/2002 | Wurmbauer | |
| 6,436,880 B1 * | 8/2002 | Frenier | C09K 8/52 |
| | | | 507/131 |
| 6,793,905 B1 | 9/2004 | Buttner et al. | |
| 7,029,553 B1 | 4/2006 | Williams et al. | |
| 7,534,754 B2 | 5/2009 | Netherton | |
| 7,547,665 B2 | 6/2009 | Welton et al. | |
| 7,621,334 B2 | 11/2009 | Welton et al. | |
| 7,658,805 B2 | 2/2010 | Netherton | |
| 7,915,205 B2 * | 3/2011 | Smith | C09K 8/74 |
| | | | 166/307 |
| 7,938,912 B1 | 5/2011 | MacDonald | |
| 8,092,555 B2 | 1/2012 | Hertz et al. | |
| 8,101,664 B2 | 1/2012 | Silvander | |
| 8,163,092 B2 | 4/2012 | Baniel et al. | |
| 8,163,102 B1 * | 4/2012 | MacDonald | C11D 1/72 |
| | | | 134/22.1 |
| 8,430,971 B1 * | 4/2013 | MacDonald | C11D 1/72 |
| | | | 134/42 |
| 8,580,047 B1 * | 11/2013 | MacDonald | C11D 1/72 |
| | | | 134/42 |
| 8,940,106 B1 * | 1/2015 | MacDonald | C11D 3/042 |
| | | | 134/36 |
| 2007/0235189 A1 * | 10/2007 | Milne | C09K 8/74 |
| | | | 166/280.1 |
| 2010/0282236 A1 | 11/2010 | Xiao et al. | |
| 2012/0149608 A1 | 6/2012 | Meyer et al. | |
| 2012/0238479 A1 * | 9/2012 | Choudhary | C09K 8/54 |
| | | | 507/204 |
| 2014/0116708 A1 * | 5/2014 | Wadekar | C09K 8/74 |
| | | | 166/307 |

FOREIGN PATENT DOCUMENTS

| | | | |
|---|---|---|---|
| GB | 1438339 | 6/1976 | |
| HU | 195241 | 4/1988 | |
| WO | WO2006136262 | * 12/2006 | C23F 11/04 |
| WO | WO2012075091 | 6/2012 | |
| WO | WO2012076841 | 6/2012 | |

OTHER PUBLICATIONS

International Search Report and Written Opinion issued in PCT/US2014/060995 on Jan. 20, 2015, 10 pages.

Liu, et al., "Acid Fracturing Technique for Carbonate Reservoirs Using Nitric Acid Powder," presented at the Petroleum Society's Canadian International Petroleum Conference, Jun. 10-12, 2003, Calgary, Alberta, Canada, 11 pages total.

* cited by examiner

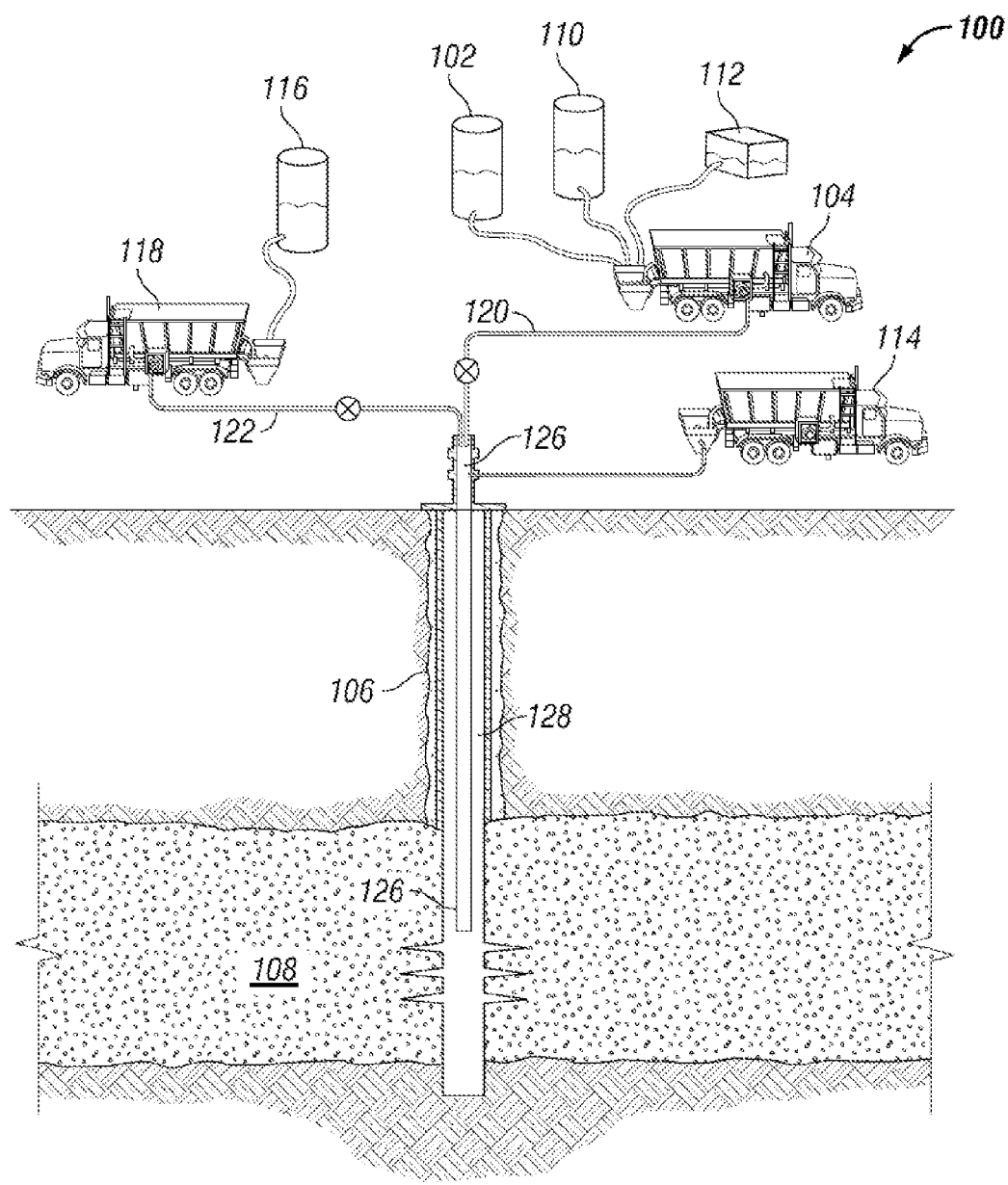

AQUEOUS SOLUTION AND METHOD FOR USE THEREOF

RELATED APPLICATION DATA

None.

BACKGROUND

The statements in this section merely provide background information related to the present disclosure and may not constitute prior art.

The technical field generally, but not exclusively, relates to high-concentration hydrochloric acid (HCl) solutions with urea, and uses thereof. Previously known solutions of HCl with urea, for example as described in U.S. Pat. No. 4,466,893, utilize urea with low HCl concentrations (at or below 15%) and in the presence of various plant-based polysaccharide gums. HCl above 15% was determined to be deleterious to the properties of previously available solutions.

SUMMARY

In an aspect, embodiments relate to compositions comprising water at a concentration lower than or equal to 20 wt %, hydrochloric acid at a concentration between 15 wt % and 45.7 wt %, and a first fixing agent comprising urea, a urea derivative or both, and a second fixing agent. The first fixing agent:hydrochloric acid molar ratio is between 0.4 and 3.0.

In a further aspect, embodiments relate to methods for inhibiting the corrosion of steel exposed to an acidic composition. A composition is prepared that comprises water at a concentration lower than or equal to 20 wt %, hydrochloric acid at a concentration between 15 wt % and 45.7 wt %, and a first fixing agent comprising urea, a urea derivative or both, and a second fixing agent. The first fixing agent:hydrochloric acid molar ratio is between 0.4 and 3.0. Then, steel is exposed to the composition.

In yet a further aspect, embodiments relate to methods for treating a subterranean well having a wellbore, at least one steel casing and a formation. A composition is prepared that comprises water at a concentration lower than or equal to 20 wt %, hydrochloric acid at a concentration between 15 wt % and 45.7 wt %, and a first fixing agent comprising urea, a urea derivative or both, and a second fixing agent. The first fixing agent:hydrochloric acid molar ratio is between 0.4 and 3.0. An oilfield treatment fluid that includes the composition is provided to a high-pressure pump. The high-pressure pump is operated to place the composition in the well such that the composition contacts the steel casing.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

FIG. 1 depicts example equipment to treat a wellbore and/or a formation fluidly coupled to the wellbore.

DETAILED DESCRIPTION OF SOME ILLUSTRATIVE EMBODIMENTS

For the purposes of promoting an understanding of the principles of the disclosure, reference will now be made to the embodiments illustrated in the drawings and specific language will be used to describe the same. It will nevertheless be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the compositions used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciates and understands that any and all data points within the range are to be considered to have been specified, and that the Applicant possessed knowledge of the entire range and all points within the range.

The term "substantially no polysaccharides" as utilized herein should be understood broadly. An example solution having substantially no polysaccharides includes a solution without any polysaccharides intentionally present in the solution. Another example solution having substantially no polysaccharides includes a fluid having polysaccharides only incidentally, for example as part of an additive, and not in an amount sufficient to support development of higher viscosity in the fluid. Example amounts of polysaccharides present in a solution include less than 0.24 g/L (2 lbm/1000 gal), less than 0.12 g/L (1 lbm/1000 gal), less than 0.06 g/L (0.5 lbm/gal), less than 0.012 g/L (0.1 lbm/1000 gal) and a solution having no polysaccharides. Yet another example solution having substantially no polysaccharides includes a fluid having no detectable polysaccharides, where the detection is performed through rheological testing. Yet another example solution having substantially no polysaccharides contemplates that polysaccharides include materials such as: galactomannans such as guar gum, gum karaya, gum tragacanth, gum ghatti, gum acacia, gum konjak, shariz, locus, psyllium, tamarind, gum tara, carrageenan, gum kauri, and modified guars such as hydroxy-propyl guar, hydroxy-ethyl guar, carboxy-methyl hydroxy-ethyl guar, and carboxy-methyl hydroxy-propyl guar.

The term "formation" as utilized herein should be understood broadly. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, a monitoring well and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "oilfield treatment fluid" as utilized herein should be understood broadly. In certain embodiments, an oilfield treatment fluid includes any fluid having utility in an oilfield type application, including a gas, oil, geothermal, or injector well. In certain embodiments, an oilfield treatment fluid includes any fluid having utility in any formation or wellbore described herein. In certain embodiments, an oilfield treatment fluid includes a matrix acidizing fluid, a wellbore cleanup fluid, a pickling fluid, a near wellbore damage cleanup fluid, a surfactant treatment fluid, an unviscosified fracture fluid (e.g. slick water fracture fluid), and/or any other fluid consistent with the fluids otherwise described herein. An oilfield treatment fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), organic acids, chelating agents, energizing agents (e.g. $CO_2$ or $N_2$), gas generating agents, solvents, emulsifying agents, flowback control agents, resins, breakers, and/or non-polysaccharide based viscosifying agents.

The term "high pressure pump" as utilized herein should be understood broadly. In certain embodiments, a high pressure pump includes a positive displacement pump that provides an oilfield relevant pumping rate—for example at least 80 L/min (0.5 bbl/min or bpm), although the specific example is not limiting. A high pressure pump includes a pump capable of pumping fluids at an oilfield relevant pressure, including at least 3.5 MPa (500 psi), at least 6.9 MPa (1,000 psi), at least 13.8 MPa (2,000 psi), at least 34.5 MPa (5,000 psi), at least 68.9 MPa (10,000 psi), up to 103.4 MPa (15,000 psi), and/or at even greater pressures. Pumps suitable for oilfield cementing, matrix acidizing, and/or hydraulic fracturing treatments are available as high pressure pumps, although other pumps may be utilized.

The term "treatment concentration" as utilized herein should be understood broadly. A treatment concentration in the context of an HCl concentration is a final concentration of the fluid before the fluid is placed in the wellbore and/or the formation for the treatment. The treatment concentration may be the mix concentration available from the HCl containing fluid at the wellsite or other location where the fluid is provided from. The treatment concentration may be modified by dilution before the treating and/or during the treating. Additionally, the treatment concentration may be modified by the provision of additives to the fluid. Example and non-limiting treatment concentrations include 7.5%, 15%, 20%, 28%, 36%, and/or up to 45.7% HCl concentration in the fluid. In certain embodiments, a treatment concentration is determined upstream of additives deliver (e.g. at a blender, hopper, or mixing tub) and the concentration change from the addition of the additives is ignored. In certain embodiments, the treatment concentration is a liquid phase or acid phase concentration of a portion of the final fluid—for example when the fluid is an energized or emulsified fluid. In certain embodiments the treatment concentration exceeds 15%. In certain embodiments, the fluid concentration exceeds 36% or exceeds 37%.

The term "urea derivative" as used herein should be understood broadly. An example urea derivative includes any urea compound having at least one of the four nitrogen bonded hydrogens substituted. The substitution products may be anything, but include at least any hydrocarbon group, and may include substitutions on one or both of the urea nitrogens. Additionally or alternatively, substitutions may include cyclic groups (e.g. ethylene urea), aromatic groups, and/or nitrogen containing hydrocarbon groups. The inclusion of a urea derivative in the present disclosure should not be read as limiting to other urea derivatives which may be used as an alternative or addition.

Applicant has determined that a first fixing agent (FA1) and a second fixing agent (FA2) have utility in inhibiting corrosion of steel exposed to hydrochloric acid solutions. In an aspect, embodiments relate to compositions that comprise water at a concentration lower than or equal to 20 wt %, hydrochloric acid, a first fixing agent and a second fixing agent. The water concentration may be lower than 10 wt %. The hydrochloric acid concentration may be between 15 wt % and 45.7 wt %, or between 15 wt % and 40 wt % or between 15 wt % and 37 wt %. The FA1 comprises urea, a urea derivative or both. The molar ratio FA1:HCl may be between 0.4 and 3.0 inclusive, or between 0.75 and 2.4 inclusive or between 1.0 and 2.4 inclusive.

In a further aspect, embodiments relate to methods for inhibiting the corrosion of steel exposed to an acidic composition. A composition is prepared that comprises water at a concentration lower than or equal to 20 wt %, hydrochloric acid, a first fixing agent and a second fixing agent. The water concentration may be lower than 10 wt %. The hydrochloric acid concentration may be between 15 wt % and 45.7 wt %, or between 15 wt % and 40 wt % or between 15 wt % and 37 wt %. The FA1 comprises urea, a urea derivative or both. The molar ratio FA1:HCl may be between 0.4 and 3.0 inclusive, or between 0.75 and 2.4 inclusive or between 1.0 and 2.4 inclusive. The steel is then exposed to the composition. Further improvements are realized in that urea and urea derivatives as fixing agents are less costly and more environmentally friendly than other corrosion inhibitors known in the art.

In yet a further aspect, embodiments relate to methods for treating a subterranean well having a steel casing. A composition is prepared that comprises water at a concentration lower than or equal to 20 wt %, hydrochloric acid, a first fixing agent and a second fixing agent. The water concentration may be lower than 10 wt %. The hydrochloric acid concentration may be between 15 wt % and 45.7 wt %, or between 15 wt % and 40 wt % or between 15 wt % and 37 wt %. The FA1 comprises urea, a urea derivative or both. The molar ratio FA1:HCl may be between 0.4 and 3.0 inclusive, or between 0.75 and 2.4 inclusive or between 1.0 and 2.4 inclusive. An oilfield treatment fluid that includes the composition is provided to a high-pressure pump. The high-pressure pump is operated to place the composition in the well such that the composition contacts the steel casing.

The hydrochloric acid may be transported to a wellsite, the acid having a concentration between 28 wt % and 45.7 wt %. The acid may then be diluted to a treatment concentration before providing the oilfield treatment fluid to the high-pressure pump.

The operation of the pump may comprise at least one of (i) injecting the treatment fluid into the formation at matrix rates; (ii) injecting the treatment fluid into the formation at a pressure equal to that necessary to fracture the formation; and (iii) contacting at least one of the wellbore and the formation with the oilfield treatment fluid.

For all aspects, the urea derivatives may comprise 1,1-dimethylurea, 1,3-dimethylurea, 1,1-diethylurea, 1,3-diethylurea, 1,1-diallylurea, 1,3-diallylurea, 1,1-dipropylurea, 1,3-dipropylurea, 1,1-dibutylurea, 1,3-dibutylurea, 1,1,3,3-tetramethylurea, 1,1,3,3-tetraethylurea, 1,1,3,3-tetrapropylurea, 1,1,3,3-tetrabutylurea, ethyleneurea, propyleneurea, 1,3-dimethylpropyleneurea or 1,3-dimethylethyleneurea, or combinations thereof.

For all aspects, the second fixing agent (FA2) may comprise a mixture of amines and alcohols. The FA2 concentration may be between 0.1 wt % and 0.5 wt % inclusive, or between 0.2 wt % and 0.5 wt % inclusive.

For all aspects, the compositions may further comprise an inhibitor aid (IA) that comprises a mixture of phenyl ketones and quaternary amines. The IA concentration may be between 0.4 wt % and 0.8 wt % inclusive, or between 0.5 wt % and 0.8 wt % inclusive.

For all aspects, the compositions may further comprise hydrofluoric acid (HF) at a concentration higher than or equal to 0.25 wt %. The HF may be present at concentrations up to 2%, up to 6%, up to 10%, up to 15%, or greater amounts. The HF may be present in addition to the amount of HCl, and/or as a substitution for an amount of the HCl.

Referencing FIG. 1, a system 100 is depicted having example equipment to treat a wellbore 106 and/or a formation 108 fluidly coupled to the wellbore 106. The formation 108 may be any type of formation with a bottomhole temperature up to at least 177° C. (350° F.). The wellbore 106 is depicted as a vertical, cased and cemented wellbore 106, having perforations providing fluid communication between the formation 108 and the interior of the wellbore 106. However, none of the particular features of the wellbore 106 are limiting, and the example is provided only to provide an example context 100 for a procedure.

The system 100 includes a high-pressure pump 104 having a source of an aqueous solution 102. In a first example, the aqueous solution 102 includes a FA1 and HCl, the HCl in an amount between 5% and 45.7% inclusive, and the FA1 present in a FA1:HCl molar ratio between 0.4 and 3.0 inclusive. The aqueous solution 102 further includes water in an amount sufficient to dissolve the HCl and the FA1, and the aqueous solution 102 includes substantially no polysaccharides. The high pressure pump 104 is fluidly coupled to the wellbore 106, through high pressure lines 120 in the example. The example system 100 includes a tubing 126 in the wellbore 106. The tubing 126 is optional and non-limiting. In certain examples, the tubing 106 may be omitted, a coiled tubing unit (not shown) may be present, and/or the high pressure pump 104 may be fluidly coupled to the casing or annulus 128. The tubing or casing may be made of steel.

Certain additives (not shown) may be added to the aqueous solution 102 to provide an oilfield treatment fluid. Additives may be added at a blender (not shown), at a mixing tub of the high pressure pump 104, and/or by any other method. In certain embodiments, a second fluid 110 may be a diluting fluid, and the aqueous solution 102 combined with some amount of the second fluid 110 may make up the oilfield treatment fluid. The diluting fluid may contain no HCl, and/or HCl at a lower concentration than the aqueous solution 102. The second fluid 110 may additionally or alternatively include any other materials to be added to the oilfield treatment fluid, including additional amounts of an FA1, or of FA2 or IA or both. In certain embodiments, an additional FA1 solution 112 is present and may be added to the aqueous solution 102 during a portion or all of the times when the aqueous solution 102 is being utilized. The additional FA1 solution 112 may include the same or a different FA1 from the aqueous solution 102, may include all of the FA1 for the oilfield treatment fluid, and/or may include FA1 at a distinct concentration from the aqueous solution.

The high-pressure pump 104 can treat the wellbore 106 and/or the formation 108, for example by positioning fluid therein, by injecting the fluid into the wellbore 106, and/or by injecting the fluid into the formation 108. Example and non-limiting operations include any oilfield treatment without limitation. Potential fluid flows include flowing from the high-pressure pump 104 into the tubing 126, into the formation 108, and/or into the annulus 128. The fluid may be recirculated out of the well before entering the formation 108, for example utilizing a back side pump 114. In the example, the annulus 128 is shown in fluid communication with the tubing 126, although in certain embodiments the annulus 128 and the tubing 126 may be isolated (e.g. with a packer). Another example fluid flow includes flowing the oilfield treatment fluid into the formation at a matrix rate (e.g. a rate at which the formation is able to accept fluid flow through normal porous flow), and/or at a rate that produces a pressure exceeding a hydraulic fracturing pressure. The fluid flow into the formation may be either flowed back out of the formation, and/or flushed away from the near wellbore area with a follow up fluid. Fluid flowed to the formation may be flowed to a pit or containment (not shown), back into a fluid tank, prepared for treatment, and/or managed in any other manner known in the art. Acid remaining in the returning fluid may be recovered or neutralized.

Another example fluid flow includes the aqueous solution 102 including HCl, with FA1 being optional and in certain embodiments not present in the aqueous solution 102. The example fluid flow includes a second aqueous solution 116 including FA1 (urea or a urea derivative). The fluid flow includes, sequentially, a first high pressure pump 104 and a second high pressure pump 118 treating the formation 108. The second high-pressure pump 118 in the example is fluidly coupled to the tubing 126 through a second high pressure line 122. The fluid delivery arrangement is optional and non-limiting. In certain embodiments, a single pump may deliver both the aqueous solution 102 and the second aqueous solution 116. In the example, either the first aqueous solution 102 or the second aqueous solution 116 may be delivered first, and one or more of the solutions 102, 116 may be delivered in multiple stages, including potentially some stages where the solutions 102, 116 are mixed.

The schematic flow descriptions which follow provide illustrative embodiments of performing procedures for treating formations and/or wellbores. Operations illustrated are understood to be examples only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Without limitation, it is contemplated the procedure includes any one of a number of specific embodiments. An example includes treating with the first oilfield treatment fluid and then the second oilfield treatment fluid, or treating with the second oilfield treatment fluid then the first oilfield treatment fluid. An example includes the first oilfield treatment fluid including no FA1, including FA1 in an amount distinct from the amount of FA1 in the second oilfield treatment fluid, and/or including FA1 in an amount that is the same or similar to the amount of FA1 in the second oilfield treatment fluid. An example includes the second oilfield treatment fluid including no HCl, including HCl in an amount distinct from the amount of HCl in the first oilfield treatment fluid, and/or including FA1 in an amount that is the same or similar to the amount of HCl in the first oilfield treatment fluid. The first and second oilfield treatment fluids do not include both the HCl amount and the FA1 amount present in identical amounts with each other, although either one of the HCl amount or the FA1 amount may be present in identical amounts with each other. Additionally, it is contemplated that multiple stages of the first oilfield treatment fluid and/or the second oilfield treatment fluid may be performed, which stages may be equal or unequal in size or number, and/or which may include spacer fluids or not between any one or more of the stages.

As is evident from the figures and text presented above, a variety of embodiments according to the present disclosure are contemplated.

The present disclosure may be further illustrated by the following examples. These examples do not limit the scope of the disclosure.

EXAMPLES

The following examples disclose the results of corrosion tests performed with N80 steel coupons. The tests conformed to standard procedures published by the American Society for Testing and Materials (ASTM). The pitting index is a qualitative visual evaluation of the number of pits that have developed on the coupon surface. The index scale is between 0 and 5, and skilled practitioners endeavor to achieve a pitting index of at most 2. The corrosion rate is expressed in $lb/ft^2$, an oilfield unit that has no SI equivalent. In the oilfield, most practitioners limit the corrosion rate to at most 0.05 $lb/ft^2$.

Chemicals used during the tests were hydrochloric acid (HCl), a first fixing agent FA1 (urea or ethyleneurea [EU]), a second fixing agent FA2 (High Temperature Corrosion Inhibitor, available from Nalco, Sugar Land, Tex., USA) and an inhibitor aid (CRONOX 247 ES, available from Baker Petrolite, Houston, Tex., USA). Second fixing agent FA2 is a mixture of amines and alcohols. The inhibitor aid is a mixture of phenyl ketones and quaternary amines.

Example 1

A 15 wt % solution of HCl was prepared by diluting 37 wt % HCl with urea (FA1) and water. Corrosion tests were performed during which the HCl solution was tested alone, with FA1, and with FA1 and FA2. The solutions were heated to 93° C. (200° F.) during which a steel coupon was immersed in each solution for four hours. The results are presented in Table 1.

TABLE 1

Corrosion test results: N80 steel; 93° C.; 4 h

| | Acid Formulation | | | Corrosion Results | |
|---|---|---|---|---|---|
| | FA1/HCl | | | | |
| Fluid | (molar ratio) | FA2 | Inhibitor aid | Pitting Index | Corrosion Rate ($lb/ft^2$) |
| 15% HCl | N/A | N/A | N/A | 3 | 0.6990 |
| 15% HCl + Urea | 1 | N/A | N/A | 3 | 0.4635 |
| 15% HCl + Urea | 1 | 0.1% | N/A | 1 | 0.0068 |

Compared to the control solution of 15% HCl, the presence of FA1 alone at an FA1/HCl molar ratio equal to 1 reduced the corrosion rate by more than 33%; however, the corrosion rate was significantly higher than 0.05 $lb/ft^2$. Satisfactory corrosion inhibition was observed by adding a small amount of FA2.

Example 2

A 15 wt % solution of HCl was prepared by diluting 37 wt % HCl with urea (FA1) and water. Corrosion tests were performed during which the HCl solution was tested alone, and with a mixture of FA2 and inhibitor aid. The solutions were heated to 135° C. (275° F.) during which a steel coupon was immersed in each solution for four hours. The results are presented in Table 2.

TABLE 2

Corrosion test results: N80 steel; 135° C.; 4 h

| | Acid Formulation | | | Corrosion Results | |
|---|---|---|---|---|---|
| | FA1/HCl | | | | |
| Fluid | (molar ratio) | FA2 | Inhibitor aid | Pitting Index | Corrosion Rate ($lb/ft^2$) |
| 15% HCl | N/A | N/A | N/A | 4 | 0.6484 |
| 15% HCl + Urea | 0.4 | N/A | N/A | 4 | 0.1066 |
| 15% HCl + Urea | 0.4 | 0.1% | 0.4% | 0 | 0.0091 |

The presence of FA1 at a molar ratio FA1/HCl=0.4 reduced the corrosion rate more than six fold compared to a solution of 15% HCl alone. However, the corrosion rate remained above 0.05 $lb/ft^2$. Satisfactory results were obtained when both FA2 and inhibitor aid were present.

The examples provided herein are illustrative only and do not limit the scope of the disclosure.

While the disclosure has provided specific and detailed descriptions to various embodiments, the same is to be considered as illustrative and not restrictive in character. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

Moreover, in reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. It is the express intention of the applicant not to invoke 35 U.S.C. §112, paragraph 6 for any limitations of any of the claims herein, except for those in which the claim expressly uses the words 'means for' together with an associated function.

We claim:

1. A method for treating a subterranean well having a wellbore, at least one steel casing and a formation, comprising:
   (i) preparing a composition comprising water at a concentration lower than or equal to 20 wt %, hydrochloric acid at a treatment concentration between 15 wt % and 45.7 wt %, a first fixing agent comprising urea, a urea derivative or both, and a second fixing agent, wherein the first fixing agent:hydrochloric acid molar ratio is between 0.4 and 3.0 inclusive;
   (ii) providing an oilfield treatment fluid including the composition to a high pressure pump, wherein the oilfield treatment fluid is not in the form of an emulsion and does not include a separate oil phase; and
   (iii) operating the high pressure pump to place the composition in the well such that the composition contacts the at least one steel casing.

2. The method of claim 1, wherein the second fixing agent comprises a mixture of amines and alcohols, and the concentration of the second fixing agent is between 0.1 wt % and 0.5 wt % inclusive.

3. The method of claim 1, wherein the composition further comprises an inhibitor aid comprising a mixture of phenyl ketones and quaternary amines, wherein the concentration of the inhibitor aid is between 0.4 wt % and 0.8 wt % inclusive.

4. The method of claim 1, wherein the composition further comprises hydrofluoric acid at a concentration higher than or equal to 0.25 wt %.

5. The method of claim 1, wherein the hydrochloric acid, prior to inclusion in the composition, is transported in an aqueous solution to a wellsite, the hydrochloric acid having a concentration between 28 wt % and 45.7 wt %, and the treating further comprises providing the transported hydrochloric acid at the treatment concentration before providing the oilfield treatment fluid to the high pressure pump.

6. The method of claim 1, wherein operating the pump comprises at least one of:
   (i) injecting the treatment fluid into the formation at matrix rates;
   (ii) injecting the treatment fluid into the formation at a pressure equal to or greater than that necessary to fracture the formation; and
   (iii) contacting at least one of the wellbore and the formation with the oilfield treatment fluid.

* * * * *